Figure 3:
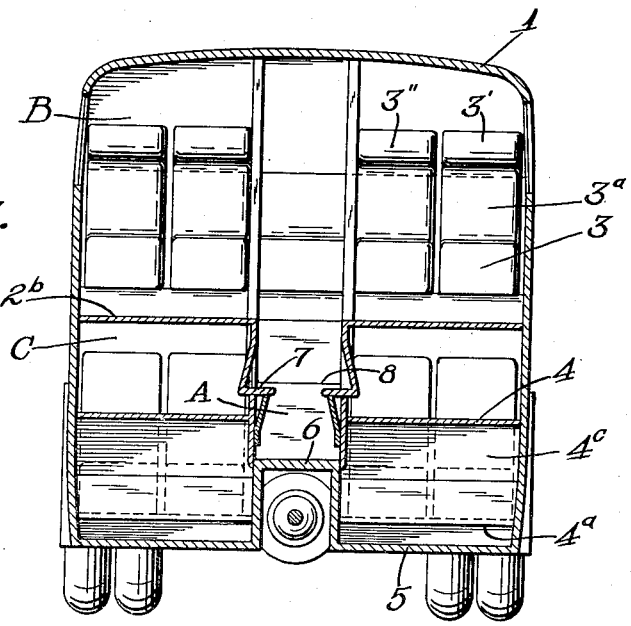

April 23, 1935.  D. E. AUSTIN  1,998,697
PASSENGER VEHICLE BODY
Filed April 1, 1931   2 Sheets-Sheet 1
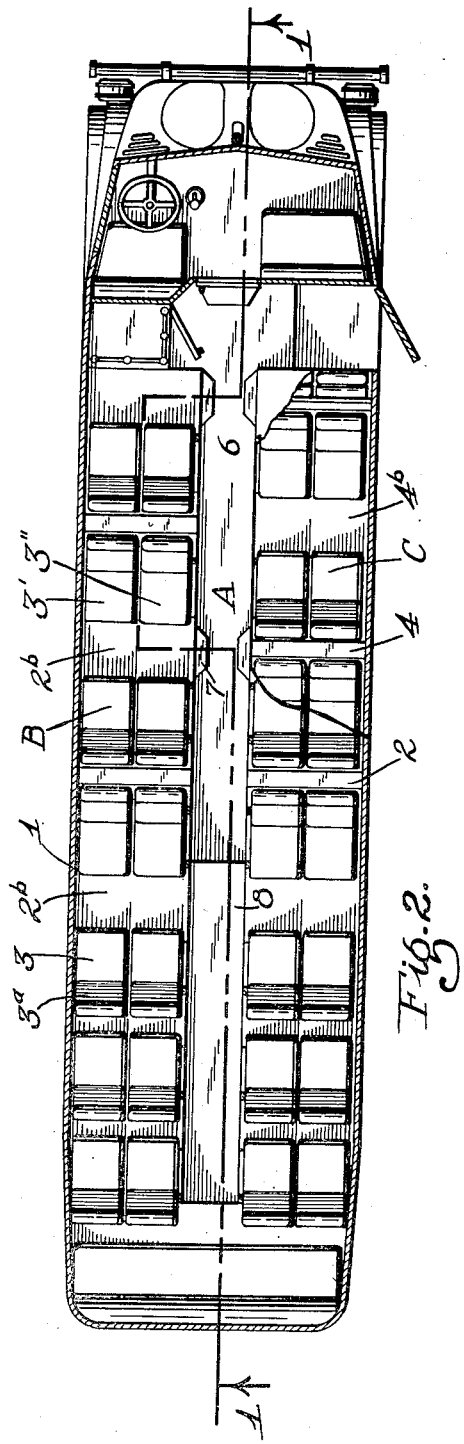
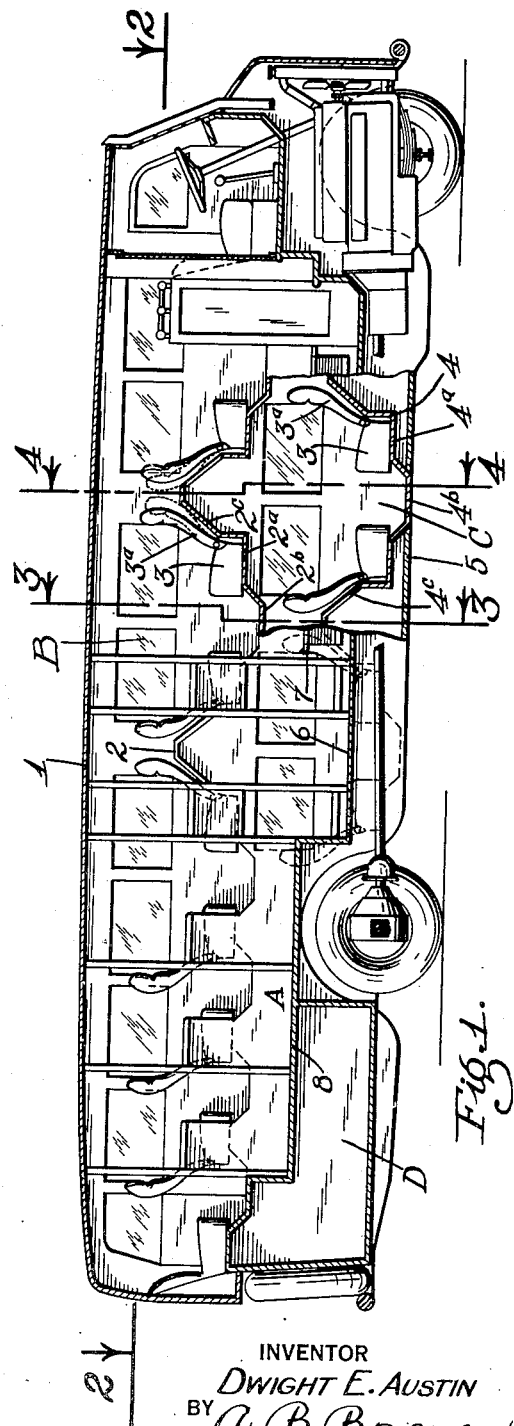
INVENTOR
*Dwight E. Austin*
BY *A. B. Bowman*
ATTORNEY April 23, 1935.　　　D. E. AUSTIN　　　1,998,697
PASSENGER VEHICLE BODY
Filed April 1, 1931　　2 Sheets-Sheet 2

INVENTOR
DWIGHT E. AUSTIN
BY A. B. Bowman
ATTORNEY

Patented Apr. 23, 1935

1,998,697

UNITED STATES PATENT OFFICE 1,998,697

PASSENGER VEHICLE BODY

Dwight E. Austin, Los Angeles, Calif., assignor, by mesne assignments, to General Motors Truck Corporation, Pontiac, Mich., a corporation of Delaware Application April 1, 1931, Serial No. 526,887

7 Claims. (Cl. 296—64)

My present invention relates to passenger vehicle bodies, and more particularly to the arrangement of passenger compartments in the body and the arrangement of the seats in the compartments.

The objects of this invention are: first, to provide a vehicle body having very large passenger carrying capacity and one in which all of the passengers may ride comfortably and even recline backwardly to a considerable extent; second, to provide a vehicle body structure in which the passenger compartments are arranged on different levels and in staggered relation, and in which the central portions of the lower compartments between the backs of seats positioned back to back in the compartments at the higher level, thus providing considerable head room for the compartments at the lower level, but in which such upward extension of the lower compartments does not interfere with the compact and convenient arrangement of the upper compartments and of the seats therein; third, to provide a vehicle structure of this class in which the total height is considerably less than a double deck vehicle but still provides ample head room in both upper and lower compartments, and one in which the several compartments at the different levels may be open at their upper portions and communicate with each other so as to provide an open and airy vehicle body even though the same is of very compact construction; fourth, to provide a vehicle body of this class in which the backs of adjacent seats in adjacent compartments are tiltably mounted so that the backs may recline at a considerable angle without interference, and in which the space between the backs of adjacently positioned seats are utilized, in the case of the seats on the upper level, for head room for the lower compartments, and, in the case of the seats on the lower level, for storage spaces; fifth, to provide as a whole a novelly constructed passenger carrying vehicle body; and, sixth, to provide a vehicle body of this class which is simple and economical of construction proportionate to its functions, durable, and which will not readily deteriorate or get out of order.

Figure 4:
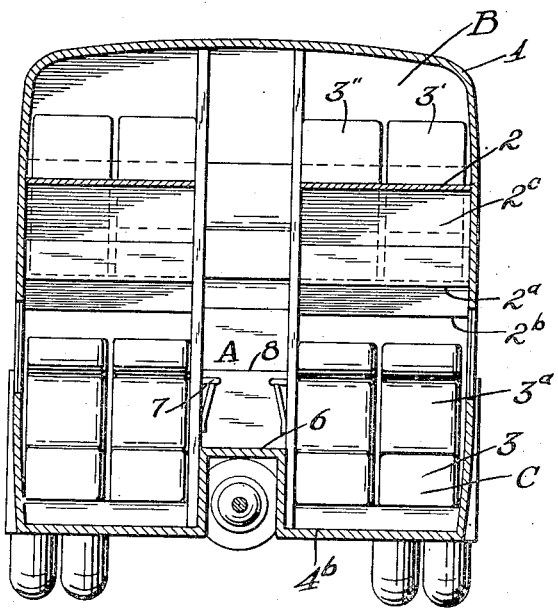

With these and other objects in view, as will appear hereinafter, I have devised a vehicle body having certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a longitudinal sectional view of a passenger carrying vehicle body incorporating my invention in one form, the section being taken through 1—1 of Fig. 2; Fig. 2 is a sectional view in plan, taken through 2—2 of Fig. 1; and Figs. 3 and 4 are enlarged transverse sectional views thereof taken through 3—3 and 4—4 of Fig. 1.

Like characters of reference refer to similar parts and portions throughout the views of the drawings.

The vehicle body, which is generally designated as 1 in the drawings, is provided with a longitudinal and central corridor or aisle A, and at the opposite sides thereof with upper passenger compartments B and lower compartments C. The upper and lower passenger compartments are separated by a substantially continuous wall 2 of generally zigzag formation providing on opposite sides thereof substantially V-shaped spaces the apices of which are alternately directed upwardly and downwardly. This partition wall 2 is provided in the sloping sides of the spaces with horizontal seat supporting portions 2a at spaced intervals between the forward and rear portions of the vehicle. On these seat supporting portions are supported seats 3, these seats being arranged in pairs in each compartment and also in opposed relation in each compartment with the seat portions extending toward each other. Each pair of seat supporting portions 2a upon which a pair of said seats is mounted, is connected by a downwardly offset wall portion 2b which serves as a foot supporting platform for the seat of the occupant of the pair of opposed seats in each compartment B. The adjacent edges of adjacent seat supporting portions of adjacent compartments B are connected by upwardly offset wall portions 2c which extend directly upwardly from the seat supporting portions and then converge toward each other forming domelike recesses which provide head room for the lower compartments C.

The seats 3 are provided with tiltable backs 3a which may assume substantially any position between an upright position and a considerably inclined position. The upwardly offset wall portions 2b are so arranged and constructed that the backs of the seats may be reclined until the upper ends of the backs in adjacent compartments B engage each other, as shown by dotted lines in Fig. 1. Thus the domelike or head clearance recesses do not interfere in any respect with the reclining of the seats in the upper compartments B.

The wall 4, forming the lower outline of the lower compartments C, may be of substantially identical construction to the partition wall 2. The same is provided with seat supporting portions 4a in which each pair is connected by a downwardly offset foot rest platform 4b and in which the opposite edges of the seat supporting portions are connected by upwardly offset walls 4c corresponding to the wall portions 2c. In the latter instance, however, the space underneath the upwardly offset wall portions 4c is used as a storage space for baggage and the like, there being provided a separate wall or floor 5 at the lower side of said storage recesses, said walls 5 being substantially in the same plane with the foot rest platforms 4b. On the seat supporting portions 4b are also supported seats 3 similarly constructed and similarly arranged relative to each other and the various portions of the lower partition wall 4.

It will be noted that in each of the compartments B and C there may be provided double seats 3' and 3" which are preferably separate so that the backs thereof may be reclined at different angles as desired.

At the rear portion of the vehicle disclosed in the drawings there are only seats shown in upper compartments and these seats are not arranged in opposed relation but are all directed forwardly. Such arrangement of seats at the upper level only permits a storage or baggage compartment D to be arranged below the rear passenger compartments.

The corridor is provided with a raised aisle 6 from which the lower compartments C and the upper compartments B are accessible. This aisle is preferably at such height that only one step is required from the aisle to the floor or foot rest platforms 4b of the lower compartments. With such arrangement, the upper compartments B are approached by one step 7 at the side of the corridor and midway between the floor of the aisle 6 and the foot rest platforms 2b. The aisle 8 which permits access to the passenger compartments at the rear portion of the vehicle is preferably on the same level as the steps 7 and is directly accessible from the aisle 6.

From the above description it will be seen that there is provided a vehicle body having vertically spaced longitudinally extending partition walls zigzag in outline providing a succession of substantially V-shaped hills and valleys, with the hills and valleys in one wall in staggered relation to those in the other wall and horizontally dividing the interior body surface.

Though I have shown and described a particular construction, combination and arrangement of parts and portions of my new passenger carrying vehicle body, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A vehicle body comprising, a pair of partitions extending longitudinally of the body in superposed spaced relation, each of said partitions being zig-zag in longitudinal vertical section to define the sloping sides of a series of substantially V-shaped spaces arranged on opposite sides thereof with their apexes directed alternately upwardly and downwardly, the upwardly directed apexes of the lower partition being disposed directly below and spaced from the downwardly directed apexes of the upper partition, recesses notched in the sloping sides of the zig-zag partitions, and seats set into said recesses.

2. A vehicle body comprising, a pair of partitions extending longitudinally in superposed relation, said partitions being zig-zag in longitudinal vertical section to form a series of substantially V-shaped hills and valleys, the hills of the lower partition being disposed below the valleys of the upper partition, notched recesses in the sloping sides of said partitions, seats set into said recesses, there being two sets of partitions arranged along opposite sides of the vehicle body, and a continuous aisle separating the sets of partitions disposed intermediate the upper and lower extremities of the lower partition.

3. A vehicle body comprising, a pair of partitions extending longitudinally in superposed relation, said partitions being zig-zag in longitudinal vertical section to form a series of substantially V-shaped hills and valleys, the hills of the lower partition being disposed below the valleys of the upper partition, notched recesses in the sloping sides of said partitions, seats set into said recesses, said seats including back portions normally extending at an angle to and tiltable towards and away from said sloping sides.

4. A vehicle body comprising, a pair of partitions extending longitudinally in superposed relation, said partitions being zig-zag in longitudinal vertical section to form a series of substantially V-shaped hills and valleys, said hills of the lower partition being disposed below the valleys of the upper partition, notched recesses in the sloping sides of said partitions, seats set into said recesses, and a floor extending along the underside of the lower partition connecting the valleys thereof and forming with the hills of the lower partition, baggage receiving spaces.

5. A vehicle body comprising, a pair of partitions extending longitudinally in superposed relation, said partitions being zig-zag in longitudinal vertical section to form a series of substantially V-shaped hills and valleys, the hills of the lower partition being disposed below the valleys of the upper partition, notched recesses in the sloping sides of the hills, seats set into said recesses, said spaces of the lower partition being in vertically spaced relation to the valleys of the upper partition to form a longitudinal continuous space between the partitions.

6. A vehicle body comprising, a partition extending longitudinally of the body and being zig-zag in longitudinal vertical section, to define a series of substantially V-shaped spaces, notched recesses in the sloping sides of said spaces adapted to receive opposed pairs of seats, a second partition disposed below the first partition and likewise zig-zag in longitudinal vertical section to define a series of spaces, the spaces of the second or lower partition being in staggered relation to those of the upper partition, notched recesses in the sloping sides of said spaces in the lower partition, adapted to receive opposed pairs of seats, said spaces on the underside of the upper partition forming standing spaces between and above opposed pairs of seats in the lower partition.

7. A vehicle body comprising, a partition extending longitudinally of the body and being zig-zag in longitudinal vertical section, to define a series of substantially V-shaped spaces, notched recesses in the sloping sides of said spaces adapted to receive opposed pairs of seats, a second partition disposed below the first partition and likewise zig-zag in longitudinal vertical section to define a series of substantially V-shaped spaces, said spaces on the upper side of the second or lower partition being in staggered relation to those on the upper side of the upper partition, notched recesses in the sloping sides of said spaces in the lower partition, and opposed pairs of seats set into said recesses, the V-shaped spaces on the underside of the upper partition forming standing spaces between and above opposed pairs of seats in the lower partition, there being two sets of upper and lower partitions one set arranged along each side of the vehicle body, a continuous aisle separating the sets of partitions and disposed at a level intermediate the upper and lower extremities of the lower partition.

DWIGHT E. AUSTIN.